United States Patent
Kang (10) Patent No.: US 9,405,416 B2
(45) Date of Patent: Aug. 2, 2016

(54) TOUCH SCREEN DRIVING DEVICE INCLUDING MULTIPLEXER WITH CROSS-COUPLED SWITCHES

(71) Applicant: LG DISPLAY CO., LTD., Seoul (KR)

(72) Inventor: Hyeongwon Kang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 108 days.

(21) Appl. No.: 14/495,163

(22) Filed: Sep. 24, 2014

(65) Prior Publication Data

US 2015/0084923 A1 Mar. 26, 2015

(30) Foreign Application Priority Data

Sep. 25, 2013 (KR) .......................... 10-2013-0114124

(51) Int. Cl.
  *G06F 3/045* (2006.01)
  *G06F 3/044* (2006.01)
  *G06F 3/041* (2006.01)

(52) U.S. Cl.
  CPC .............. *G06F 3/044* (2013.01); *G06F 3/0418* (2013.01)

(58) Field of Classification Search
  CPC ................................ G06F 3/044; G06F 3/0418
  USPC ........................................................ 345/174
  See application file for complete search history.

(56) References Cited

U.S. PATENT DOCUMENTS

| 6,075,520 | A  | * | 6/2000 | Inoue  | G06F 3/044 178/18.01 |
| 2002/0005858 | A1 | * | 1/2002 | Aoki | G09G 3/3648 345/618 |
| 2010/0110040 | A1 | * | 5/2010 | Kim | G06F 3/0412 345/174 |
| 2012/0062499 | A1 | * | 3/2012 | Weaver | G06F 3/03545 345/174 |
| 2012/0127143 | A1 | * | 5/2012 | Gondo | G09G 3/3648 345/208 |
| 2015/0185913 | A1 | * | 7/2015 | Han | G06F 3/0418 345/174 |

* cited by examiner

*Primary Examiner* — Jonathan Blancha
(74) *Attorney, Agent, or Firm* — Dentons US LLP

(57) ABSTRACT

A touch screen driving device includes a touch screen including Tx channels, Rx channels, and sensor nodes formed at crossings of the Tx channels and the Rx channels, a Tx driving circuit supplying a Tx driving pulse to the Tx channels, sensing units sampling voltages of the sensor nodes supplied through the Rx channels, a multiplexer (mux) array including mux switches, each of which is cross-coupled with output terminals of the sensing units adjacent to each mux switch, an analog-to-digital converter converting an analog sampling signal received from the mux array into digital data, an average unit which averages the digital data and removes noise included in the digital data, and a touch controller which analyzes the digital data, in which the noise is removed, using a touch recognition algorithm and outputs touch data including coordinate information of a touch position.

4 Claims, 8 Drawing Sheets

OUT1 = Touch Signal(Rx1) + Touch Signal(Rx2) + Noise(Rx1) + Noise(Rx2)

OUT2 = Touch Signal(Rx2) + Touch Signal(Rx1) + Touch Signal(Rx3) +
       Noise(Rx2) + Noise(Rx1) + Noise(Rx3)

OUT3 = Touch Signal(Rx3) + Touch Signal(Rx2) + Touch Signal(Rx4) +
       Noise(Rx3) + Noise(Rx2) + Noise(Rx4)

OUT4 = Touch Signal(Rx4) + Touch Signal(Rx3) + Touch Signal(Rx5) +
       Noise(Rx4) + Noise(Rx3) + Noise(Rx5)

OUT5 = Touch Signal(Rx5) + Touch Signal(Rx4) + Touch Signal(Rx6) +
       Noise(Rx5) + Noise(Rx4) + Noise(Rx6)

OUT6 = Touch Signal(Rx6) + Touch Signal(Rx5) + Noise(Rx6) + Noise(Rx5)

TOUCH SCREEN DRIVING DEVICE INCLUDING MULTIPLEXER WITH CROSS-COUPLED SWITCHES

This application claims the benefit of Korea Patent Application No. 10-2013-0114124, filed on Sep. 25, 2013, which is incorporated by reference for all purposes as if fully set forth herein.

BACKGROUND OF THE INVENTION

1. Field of the Invention

The present invention relates to a touch screen driving device.

2. Discussion of the Related Art

An user interface (UI) is configured so that users are able to communicate with various electronic devices and thus can easily and comfortably control the electronic devices. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been used in portable information appliances and has been expanded to the use of home appliances. A mutual capacitive touch screen has been recently considered as an example of a touch screen for implementing the touch UI. The mutual capacitive touch screen can sense a proximity input as well as a touch input and also can recognize respective multi-touch (or multi-proximity) inputs.

The mutual capacitive touch screen includes Tx channels, Rx channels crossing the Tx channels, and sensor capacitors formed at crossings of the Tx channels and the Rx channels. Each sensor capacitor has a mutual capacitance. A touch screen driving device senses changes in voltages charged to the sensor capacitors before and after a touch operation and decides whether there is a touch (or proximity) input using a conductive material. Further, the touch screen driving device determines a position of the touch input when there is a touch input. To sense the voltages charged to the sensor capacitors, a Tx driving circuit applies a driving signal to the Tx channels, and an Rx driving circuit samples a small change in the voltages of the sensor capacitors in synchronization with the driving signal and performs an analog-to-digital conversion.

In general, examples of a factor reducing a signal-to-noise ratio (SNR) of touch data include a channel noise depending on the arrangement of channels and structural characteristics of the touch screen, and an external noise. Examples of the external noise include a floating body, 3-wavelength noise, and a charge noise. Examples of the channel noise include a high frequency noise/low frequency noise of an input signal, channel DC offset, and an interference noise between channels.

A deviation between touch data of channels is generated by different resistor parameters and different capacitor parameters in the touch screens of various structures. Even in the same touch screen, a deviation between touch data input to a touch integrated circuit (IC) is generated by the variation of an influence of an external environment (for example, PCB routing, external noise, etc.) depending on a position and the variation of the resistor parameter and the capacitor parameter. The deviation reduces the signal-to-noise ratio of the touch data and thus reduces touch reliability.

SUMMARY OF THE INVENTION

Accordingly, embodiments of the invention provide a touch screen driving device capable of improving touch reliability by increasing a signal-to-noise ratio (SNR) of touch data.

In one aspect, a touch screen driving device comprises a touch screen including Tx channels, Rx channels crossing the Tx channels, and sensor nodes formed at crossings of the Tx channels and the Rx channels, a Tx driving circuit configured to supply a Tx driving pulse to the Tx channels, a plurality of sensing units configured to sample voltages of the sensor nodes supplied through the Rx channels in response to an Rx sampling clock, a multiplexer (mux) array including a plurality of mux switches, each of which is cross-coupled with output terminals of the sensing units adjacent to each mux switch, an analog-to-digital converter configured to convert an analog sampling signal sequentially received from the mux array into digital data, an average unit configured to average the digital data received from the analog-to-digital converter and remove noise included in the digital data, and a touch controller configured to analyze the digital data, in which the noise is removed, using a previously determined touch recognition algorithm and output touch data including coordinate information of a touch position.

The touch screen driving device further comprises an integrator configured to integrate and accumulate the digital data, in which the noise is removed, and supply the accumulated digital data to the touch controller.

A kth mux switch among the plurality of mux switches is connected to an output terminal of a kth sensing unit, an output terminal of a (k−1)th sensing unit, and an output terminal of a (k+1)th sensing unit, where k is a positive integer. The kth mux switch sequentially outputs a kth analog sampling signal received from the kth sensing unit, a (k−1)th analog sampling signal received from the (k−1)th sensing unit, and a (k+1)th analog sampling signal received from the (k+1)th sensing unit.

The average unit sequentially latches the digital data received from the analog-to-digital converter and then averages the latched digital data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention. In the following description, a Tx line may be used as a Tx channel, and an Rx line may be used as an Rx channel.

As illustrated in FIGS. 1 to 5, a display device according to an embodiment of the invention includes a display panel DIS, a display driving circuit, a timing controller 20, a touch screen TSP, a touch screen driving circuit, a touch controller 30, and the like. All components of the display device may be operatively coupled and configured.

The display device according to the embodiments of the invention may be implemented based on a flat panel display, such as a liquid crystal display (LCD), a field emission display (FED), a plasma display panel (PDP), an organic light emitting display, and an electrophoresis display (EPD). In the following description, the embodiment of the invention will be described using the liquid crystal display as an example of the flat panel display. Other flat panel displays may be used.

As shown in FIGS. 1 and 3-5, the display panel DIS includes a lower substrate GLS2, an upper substrate GLS1, and a liquid crystal layer formed between the lower substrate GLS2 and the upper substrate GLS1. The lower substrate GLS2 of the display panel DIS includes a plurality of data lines D1 to Dm (where m is a natural number), a plurality of gate lines (or scan lines) G1 to Gn crossing the data lines D1 to Dm (where n is a natural number), a plurality of thin film transistors (TFTs) formed at crossings of the data lines D1 to Dm and the gate lines G1 to Gn, a plurality of pixel electrodes for charging liquid crystal cells to a data voltage, a plurality of storage capacitors, each of which is connected to the pixel electrode and holds a voltage of the liquid crystal cell, and the like.

Figure 1:
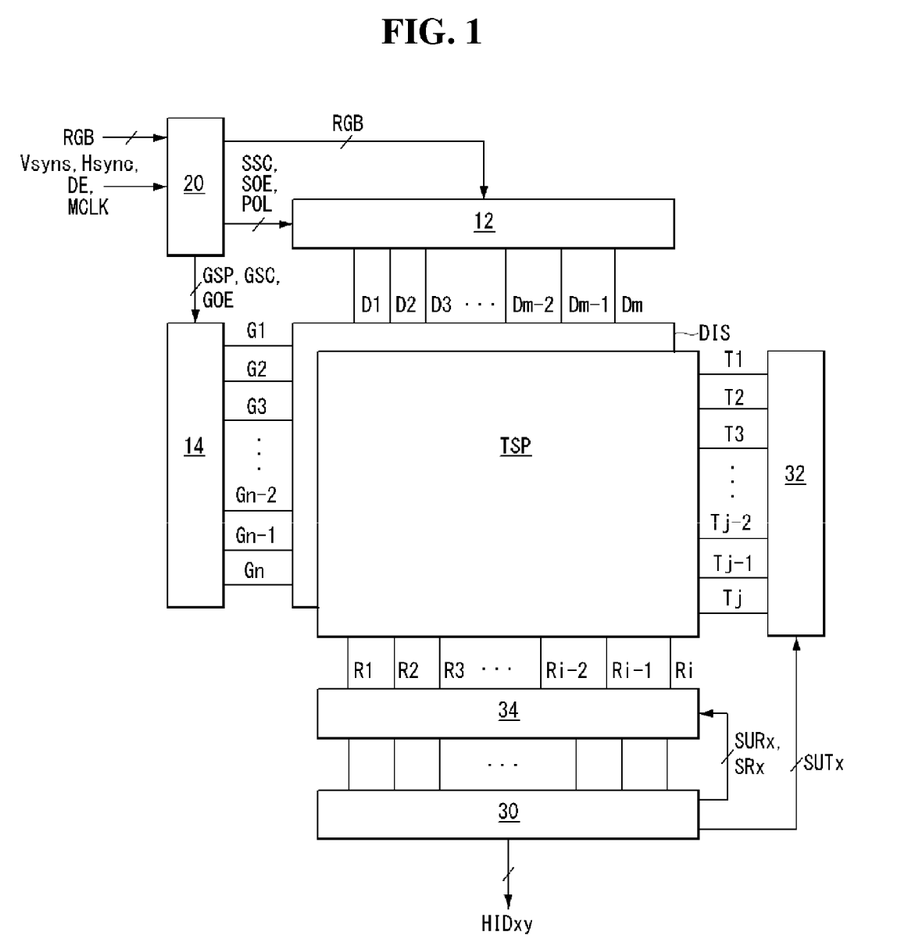
FIG. 1 is a block diagram of a display device according to an exemplary embodiment of the invention.

Pixels of the display panel DIS are respectively formed in pixel areas defined by the data lines D1 to Dm and the gate lines G1 to Gn and are arranged in a matrix form. The liquid crystal cell of each pixel is driven by an electric field generated based on a difference between the data voltage supplied to the pixel electrode and a common voltage supplied to a common electrode, thereby adjusting an amount of incident light transmitted by the liquid crystal cell. The TFTs are turned on in response to a gate pulse (or a scan pulse) from the gate lines G1 to Gn, thereby supplying the data voltage from the data lines D1 to Dm to the pixel electrodes of the liquid crystal cells.

The upper substrate GLS1 of the display panel DIS may include black matrixes, color filters, and the like. The lower substrate GLS2 of the display panel DIS may be configured in a COT (color filter on TFT) structure. In this instance, the black matrixes and the color filters may be formed on the lower substrate GLS2 of the display panel DIS.

Figure 3:
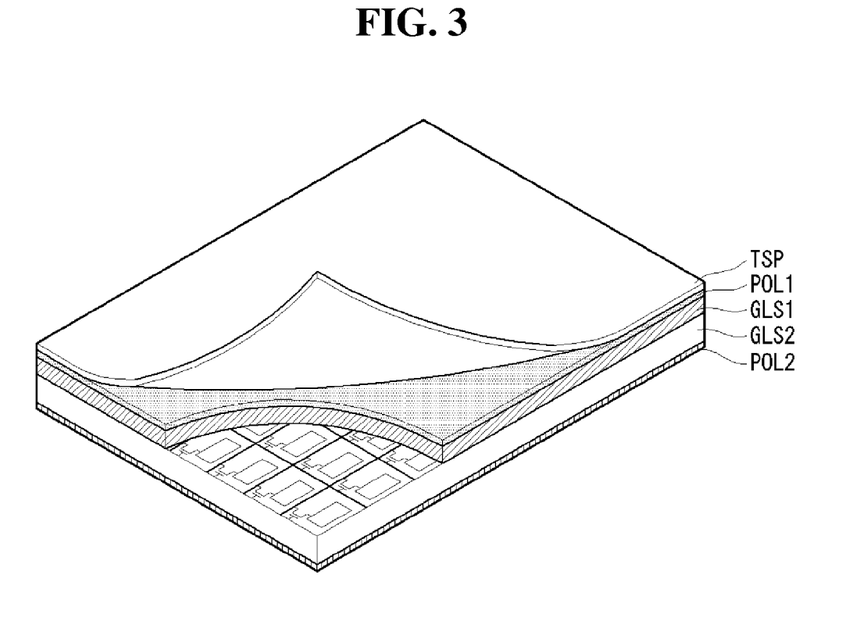
FIGS. 3 to 5 illustrate various combinations of a touch screen and a display panel according to exemplary embodiments of the invention.
Figure 4:
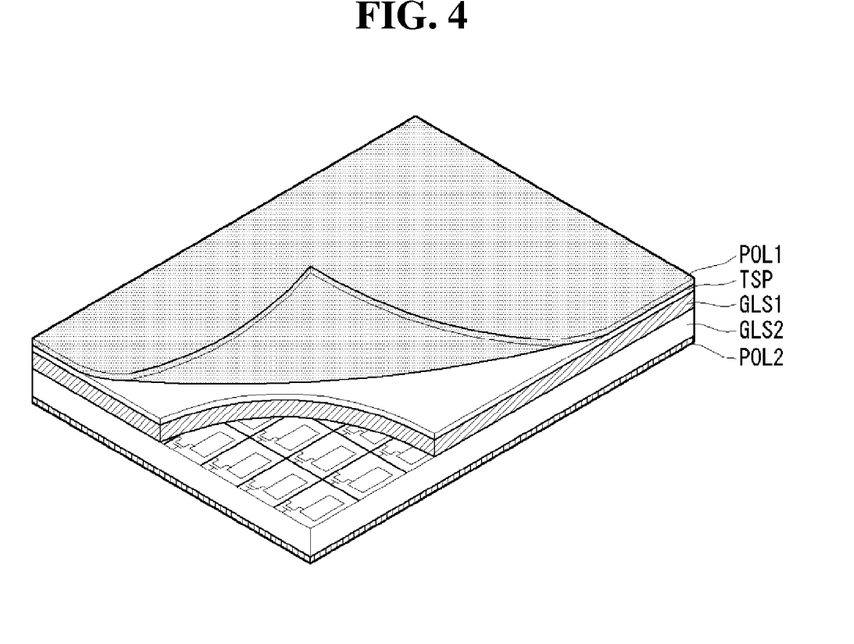
Figure 5:
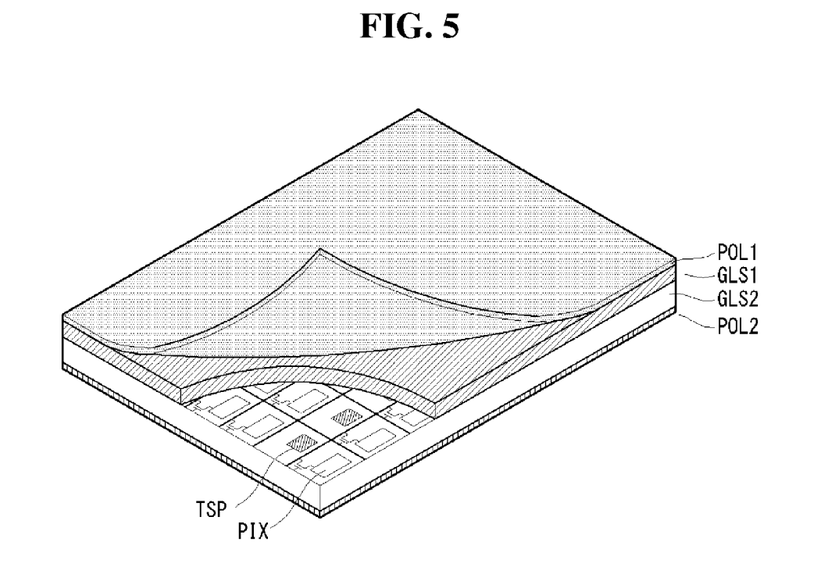
Figure 6:
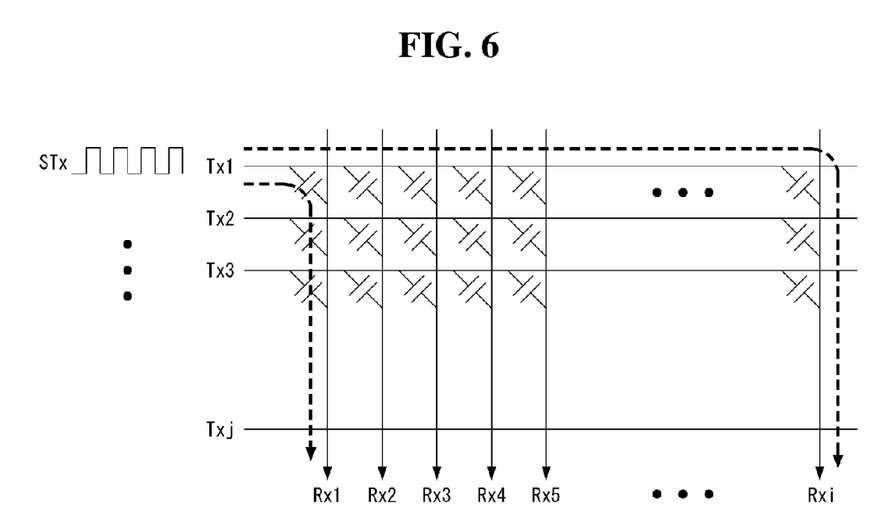
FIG. 6 shows that an RC delay difference between Rx channels that is generated in a touch screen.

Polarizing plates POL1 and POL2 are respectively attached to the upper and lower substrates GLS1 and GLS2 of the display panel DIS. Alignment layers for setting a pre-tilt angle of liquid crystals are respectively formed on the inner surfaces contacting the liquid crystals in the upper and lower substrates GLS1 and GLS2 of the display panel DIS. A column spacer is formed between the upper and lower substrates GLS1 and GLS2 of the display panel DIS to keep cell gaps of the liquid crystal cells constant.

A backlight unit may be disposed on a back surface of the display panel DIS. The backlight unit may be configured as one of an edge type backlight unit and a direct type backlight unit to provide light to the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit of the display panel DIS includes a data driving circuit 12 and a scan driving circuit 14. The display driving circuit applies a video data voltage of an input image to the pixels of the display panel DIS. The data driving circuit 12 converts digital video data RGB received from the timing controller 20 into positive and negative analog gamma compensation voltages and outputs the data voltage. The data driving circuit 12 then supplies the data voltage to the data lines D1 to Dm. The scan driving circuit 14 sequentially supplies the gate pulse synchronized with the data voltage to the gate lines G1 to Gn and selects lines of the display panel DIS to which the data voltage will be applied.

The timing controller 20 receives timing signals, such as a vertical sync signal Vsync, a horizontal sync signal Hsync, a data enable signal DE, and a main clock MCLK, from an external host system. The timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, etc.

As shown in FIG. 3, the touch screen TSP may be attached on the upper polarizing plate POL1 of the display panel DIS. Alternatively, as shown in FIG. 4, the touch screen TSP may be formed between the upper polarizing plate POL1 and the upper substrate GLS1. Alternatively, as shown in FIG. 5, sensor nodes TSCAP (refer to FIG. 2) of the touch screen TSP may be formed on the lower substrate GLS2 along with a pixel array of the display panel DIS in an in-cell type. In FIGS. 3 to 5, 'PIX' denotes the pixel electrode of the liquid crystal cell.

Figure 2:
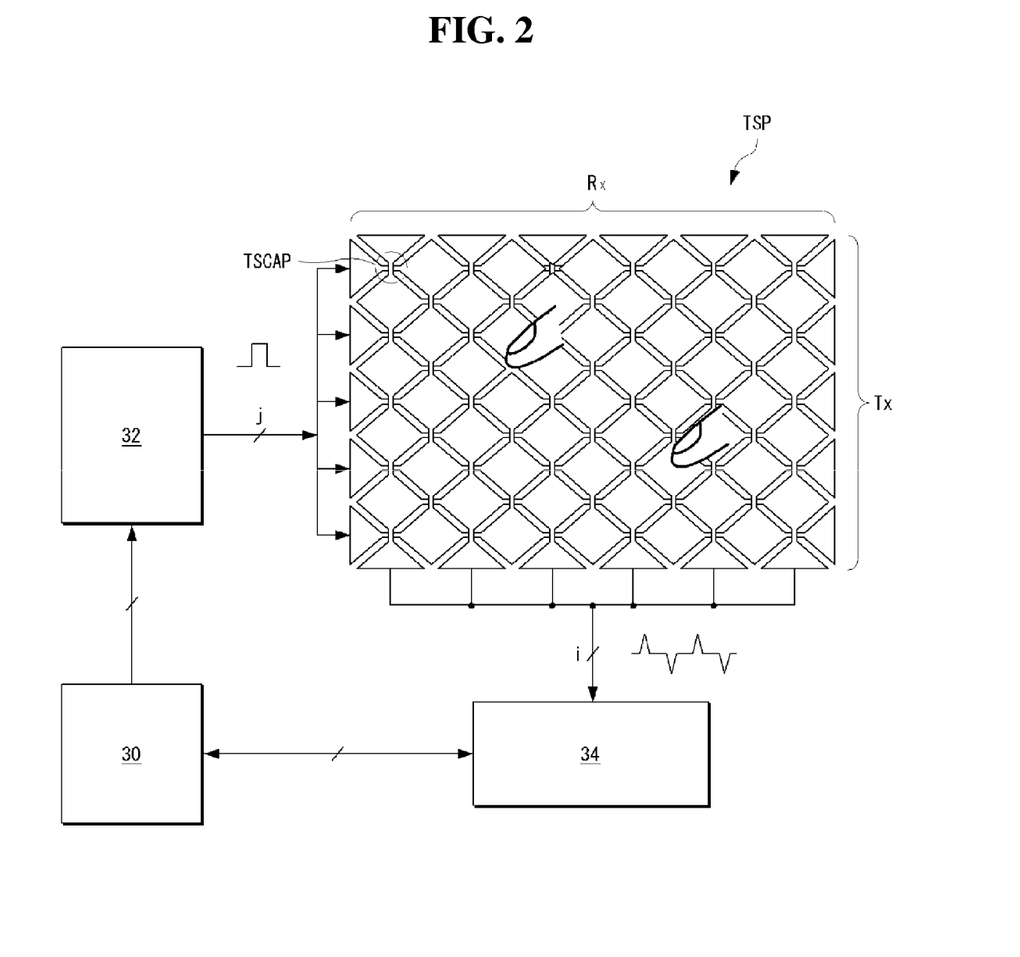
FIG. 2 illustrates the touch screen driving device shown in FIG. 1.

In FIG. 2, the touch screen TSP includes Tx lines T1 to Tj (where j is a positive integer less than n), Rx lines R1 to Ri crossing the Tx lines T1 to Tj (where i is a positive integer less than m), and i×j sensor nodes TSCAP formed at crossings of the Tx lines T1 to Tj and the Rx lines R1 to Ri.

The touch screen driving circuit includes a Tx driving circuit 32 and an Rx driving circuit 34. The touch screen driving circuit supplies a driving pulse to the Tx lines T1 to Tj, senses voltages of the sensor nodes TSCAP through the Rx lines R1 to Ri, and converts the sensed voltages of the sensor nodes TSCAP into digital data. The Tx driving circuit 32 and the Rx driving circuit 34 may be integrated into one readout integrated circuit (ROIC).

The Tx driving circuit 32 sets a Tx channel in response to a Tx setup signal SUTx received from the touch controller 30 and supplies the driving pulse to the Tx lines T1 to Tj connected to the set Tx channel. If the j sensor nodes TSCAP are connected to one Tx line, the driving pulse may be successively supplied to the one Tx line j times and then may be successively supplied to a next Tx line j times in the same manner.

Figure 10:
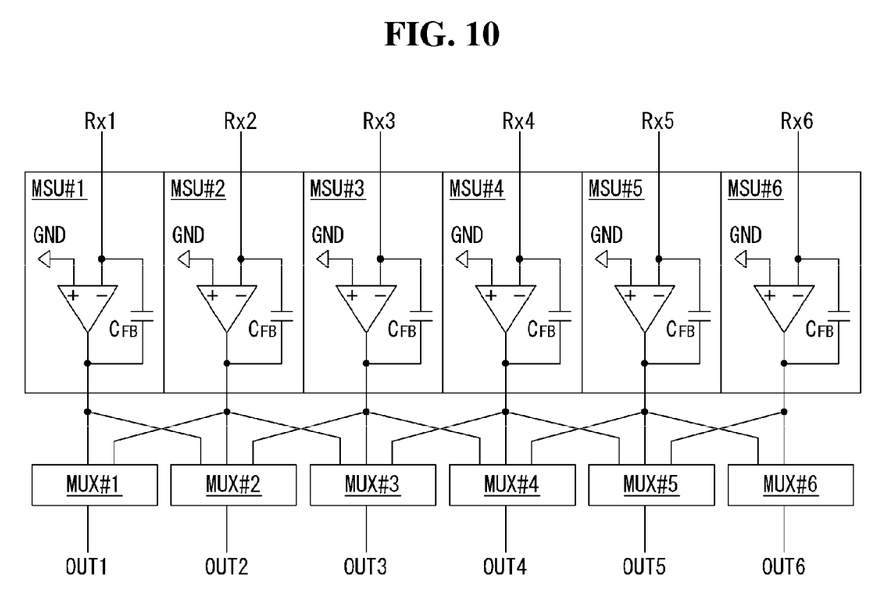
FIG. 10 shows a plurality of multiplexer (or mux) switches cross-coupled with output terminals of adjacent sensing units.

The Rx driving circuit 34 sets Rx channels, which will receive the voltages of the sensor nodes TSCAP, in response to an Rx setup signal SURx received from the touch controller 30 and receives the voltages of the sensor nodes TSCAP through the Rx lines R1 to Ri connected to the set Rx channels. The Rx driving circuit 34 charges a sampling capacitor CFB (refer to FIG. 7) to the voltages of the sensor nodes TSCAP in response to Rx sampling clocks SRx received from the touch controller 30 and samples the voltage of each sensor node TSCAP. The sensor nodes TSCAP each having a mutual capacitance are formed respectively at crossings of Tx channels Tx1 to Txj and Rx channels Rx1 to Rxi on the touch screen TSP. The sensor nodes TSCAP have different RC delay values depending on their formation position. As shown in FIG. 10, the Rx driving circuit 34 distributes a noise included in the voltages of the sensor nodes TSCAP supplied through the Rx channels through a switching operation of a plurality of multiplexer (or mux) switches, each of which is cross-coupled with output terminals of sensing units adjacent to each mux switch, so as to remove a deviation (i.e., the noise) in an amount of offset charges by the RC delay value, etc. of each channel. The Rx driving circuit 34 converts an analog sampling signal including the noise into digital data, and then latches and averages the digital data, thereby removing the noise included in the digital data. The Rx driving circuit 34 analyzes the digital data, in which the noise is removed, using a previously determined touch recognition algorithm. The Rx driving circuit 34 converts the digital data into touch raw data including coordinate information of a touch position and then transmits the touch raw data to the touch controller 30.

The touch controller 30 is connected to the Tx driving circuit 32 and the Rx driving circuit 34 through an interface, such as I2C bus, a serial peripheral interface (SPI), and a system bus. The touch controller 30 supplies the Tx setup signal SUTx to the Tx driving circuit 32 and sets the Tx channel, to which a driving pulse STx will be output. Further, the touch controller 30 supplies the Rx setup signal SURx to the Rx driving circuit 34 and selects the Rx channels, in which the voltages of the sensor nodes TSCAP will be read. The touch controller 30 supplies the Rx sampling clocks SRx for controlling sampling switches of a sampling circuit embedded in the Rx driving circuit 34 to the Rx driving circuit 34, thereby controlling a voltage sampling timing of the sensor nodes TSCAP.

Further, the touch controller 30 supplies analog-to-digital conversion clocks to an analog-to-digital converter (ADC) embedded in the Rx driving circuit 34, thereby controlling operation timing of the ADC.

The touch controller 30 analyzes the touch raw data received from the Rx driving circuit 34 using the previously determined touch recognition algorithm. The touch controller 30 estimates coordinates of touch raw data, which is equal to or greater than a predetermined value, and outputs touch data HIDxy including coordinate information. The touch data HIDxy output from the touch controller 30 is transmitted to the external host system. The touch controller 30 may be implemented as a microcontroller unit (MCU).

The host system may be connected to an external video source equipment, for example, a navigation system, a set-top box, a DVD player, a Blu-ray player, a personal computer (PC), a home theater system, a broadcasting receiver, and a phone system and may receive image data from the external video source equipment. The host system includes a system on chip (SoC) including a scaler and converts the image data received from the external video source equipment into a format suitable for displaying on the display panel DIS. Further, the host system runs an application associated with the coordinates of the touch data received from the touch controller 30.

Figure 7:
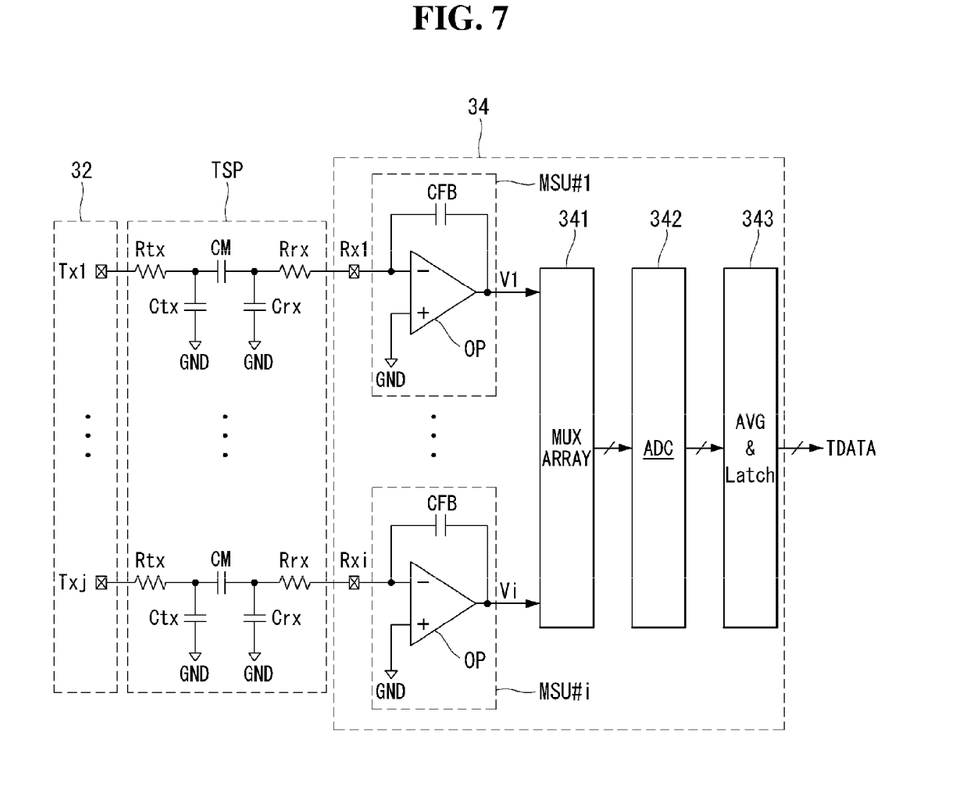
FIGS. 7 to 9 illustrate configurations of a touch screen and an Rx driving circuit.
Figure 8:
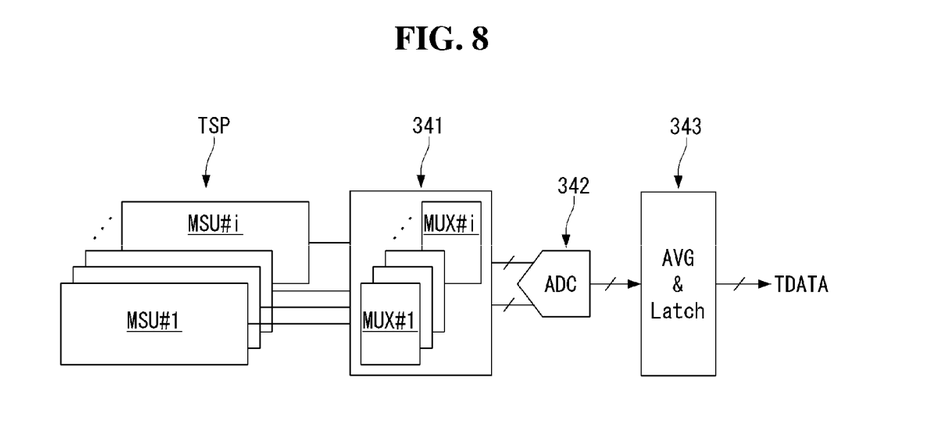
Figure 9:
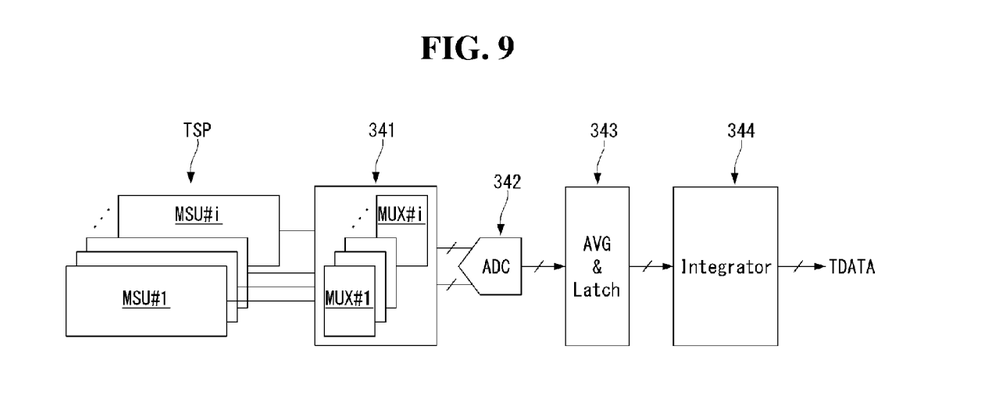

FIGS. 7 to 9 illustrate configurations of the touch screen and the Rx driving circuit.

As shown in FIGS. 7 and 8, the touch screen driving device according to the embodiment of the invention includes the Tx driving circuit 32, the touch screen TSP, and the Rx driving circuit 34.

The Tx driving circuit 32 includes the plurality of Tx channels Tx1 to Txj. When the Tx driving circuit 32 applies the Tx driving pulse to the touch screen TSP, the touch screen TSP outputs the voltages of the sensor nodes connected with the Tx channels Tx1 to Txj, to which the Tx driving pulse is applied, through the Rx channels Rx1 to Rxi. In FIG. 7, "Ctx" denotes a parasitic capacitance of the Tx line, "Crx" denotes a parasitic capacitance of the Rx line, "Rtx" denotes a load resistance of the Tx line, "Rrx" denotes a load resistance of the Rx line, and "CM" denotes a mutual capacitance implemented by the sensor node.

The Rx driving circuit 34 includes a plurality of sensing units MSU#1 to MSU#i, a mux array 341, an analog-to-digital converter (ADC) 342, and an average unit 343.

The sensing units MSU#1 to MSU#i are respectively connected to the Rx channels Rx1 to Rxi. Each of the sensing units MSU#1 to MSU#i includes an operational amplifier OP and a sampling capacitor CFB connected between an inverting input terminal (−) and an output terminal of the operational amplifier OP. The inverting input terminal (−) of the operational amplifier OP is connected to the Rx channel, and a non-inverting input terminal (+) of the operational amplifier OP is connected to a ground level voltage source GND. The output terminal of the operational amplifier OP is connected to the mux array 341. The sensing units MSU#1 to MSU#i sample the voltages of the sensor nodes supplied through the Rx channels Rx1 to Rxi in response to the Rx sampling clocks SRx and store the sampled voltages in the sampling capacitors CFB.

The mux array 341 includes a plurality of mux switches, each of which is cross-coupled with output terminals of the sensing units adjacent to each mux switch. The mux array 341 efficiently distributes voltages (i.e., noises included in the analog sampling signal) V1 to Vi of the sensor nodes received from the sensing units MSU#1 to MSU#i through the connection configuration of the mux switches.

The ADC 342 converts the analog sampling signals sequentially received from the mux array 341 into digital data.

The average unit 343 averages the digital data received from the ADC 342 and removes the noise included in the digital data. More specifically, the average unit 343 sequentially latches the digital data received from the ADC 342 and then averages the latched digital data.

In FIG. 9, the Rx driving circuit 34 may further include an integrator 344 connected to an output terminal of the average unit 343. The integrator 344 integrates and accumulates the digital data, in which the noise is removed, and then supplies the accumulated digital data to the touch controller 30. Hence, the integrator 344 increases a signal-to-noise ratio (SNR) of touch data and may improve touch reliability. In FIGS. 7 to 9, "TDATA" denotes noiseless digital data supplied to the touch controller 30.

Figure 11:
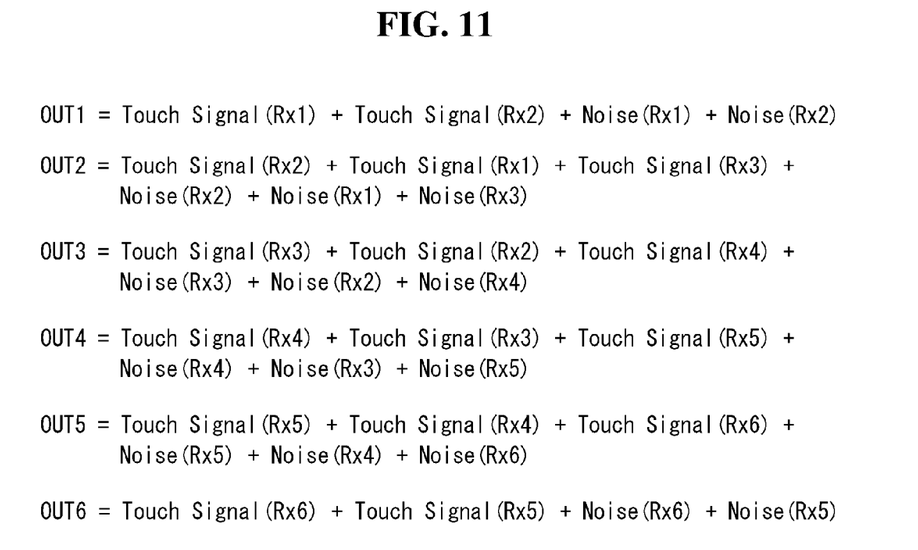
FIG. 11 shows one configuration of analog sampling signals output from mux switches shown in FIG. 10.

FIG. 10 shows in detail the plurality of mux switches cross-coupled with the output terminals of the adjacent sensing units. FIG. 11 shows one configuration of the analog sampling signals output from the mux switches shown in FIG. 10.

As shown in FIG. 10, mux switches MUX#1 to MUX#6 are respectively connected to output terminals of sensing units MSU#1 to MSU#6, and also each of the mux switches MUX#1 to MUX#6 is cross-coupled with the output terminals of the sensing units adjacent to each mux switch.

More specifically, a kth mux switch MUX#k (where k is a positive integer) is connected to an output terminal of a kth sensing unit MSU#k, an output terminal of a (k−1)th sensing unit MSU#(k−1), and an output terminal of a (k+1)th sensing unit MSU#(k+1). Hence, the kth mux switch MUX#k sequentially outputs a kth analog sampling signal received from the kth sensing unit MSU#k, a (k−1)th analog sampling signal received from the (k−1)th sensing unit MSU#(k−1), and a (k+1)th analog sampling signal received from the (k+1)th sensing unit MSU#(k+1).

Configuration of the analog sampling signals output from the mux switches MUX#1 to MUX#6 is shown in FIG. 11. As shown in FIG. 11, a first analog sampling signal OUT1 sequentially output from the first mux switch MUX#1 includes a touch signal 2 and a noise signal 2 in addition to a touch signal 1 and a noise signal 1. Because the touch signals 1 and 2 generally have pulse shapes of the same phase, the touch signals 1 and 2 are held at a predetermined value by an average operation of the average unit. On the other hand, because the noise signals 1 and 2 have pulse shapes of antiphase, the noise signals 1 and 2 cancel each other out by the average operation of the average unit.

In the same manner, a fifth analog sampling signal OUT5 sequentially output from the fifth mux switch MUX#5 includes a touch signal 4, a noise signal 4, a touch signal 6, and a noise signal 6 in addition to a touch signal 5 and a noise signal 5. Because the touch signals 4, 5, and 6 generally have pulse shapes of the same phase, the touch signals 4, 5, and 6 are held at a predetermined value by the average operation of the average unit. On the other hand, because the noise signals 4, 5, and 6 have pulse shapes of antiphase, the noise signals 4, 5, and 6 cancel each other out by the average operation of the average unit.

As described above, the embodiment of the invention minimizes the channel noise and the offset deviation of the touch screen depending on a position, thereby increasing the signal-to-noise ratio of the touch data and greatly reducing the deviation between the touch data of the Rx channels. Further, the embodiment of the invention changes the connection configuration of the existing mux array and obtains the noise cancelling effect through the simple configuration of the mux array, in which only the average unit is added as compared with the existing mux array. Hence, the embodiment of the invention is advantageous to the optimization of the size of the touch screen driving device as compared with other methods for removing the noise. Further, because the embodiment of the invention can remove the noise through the simple method, the touch data can be relatively accurately extracted without increasing the number of sampling operations of the voltages of the sensor nodes. Hence, touch report time can be greatly reduced.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen driving device, comprising:
   a touch screen including Tx channels, Rx channels crossing the Tx channels, and sensor nodes at crossings of the Tx channels and the Rx channels;
   a Tx driving circuit to supply a Tx driving pulse to the Tx channels;
   a plurality of sensing units to sample voltages of the sensor nodes supplied through the Rx channels in response to an Rx sampling clock;
   a multiplexer (mux) array including a plurality of mux switches with one of the plurality of mux switches corresponding to one each of the plurality sensing units, respectively, each of which is simultaneously cross-coupled with output terminals of the sensing units adjacent to each mux switch, wherein each mux switch outputs data for the corresponding sensing unit and an adjacent sensing unit;
   an analog-to-digital converter to convert an analog sampling signal sequentially received from the mux array into digital data;
   an average unit to average the digital data received from the analog-to-digital converter and remove noise included in the digital data; and
   a touch controller to analyze the digital data, in which the noise is removed, using a previously determined touch recognition algorithm and output touch data including coordinate information of a touch position.

2. The touch screen driving device of claim 1, further comprising an integrator to integrate and accumulate the digital data, in which the noise is removed, and supply the accumulated digital data to the touch controller.

3. The touch screen driving device of claim 1, wherein a kth mux switch among the plurality of mux switches is simultaneously connected to an output terminal of a kth sensing unit, an output terminal of a (k−1)th sensing unit, and an output terminal of a (k+1)th sensing unit, where k is a positive integer,
   wherein the kth mux switch outputs an output signal including a kth analog sampling signal received from the kth sensing unit, a (k−1)th analog sampling signal received from the (k−1)th sensing unit, and a (k+1)th analog sampling signal received from the (k+1)th sensing unit.

4. The touch screen driving device of claim 1, wherein the average unit sequentially latches the digital data received from the analog-to-digital converter and then averages the latched digital data.

* * * * *